(12) United States Patent
Anderson et al.

(10) Patent No.: US 8,621,062 B1
(45) Date of Patent: Dec. 31, 2013

(54) PUSH SIGNALING TO RUN JOBS ON AVAILABLE SERVERS

(71) Applicant: Opscode, Inc., Seattle, WA (US)

(72) Inventors: Mark Andrew Anderson, Seattle, WA (US); Christopher James Brown, Issaquah, WA (US); Kevin Allen Smith, Raleigh, NC (US); John Braden Keiser, North Bend, WA (US)

(73) Assignee: Opscode, Inc., Seattle, WA (US)

( * ) Notice: Subject to any disclaimer, the term of this patent is extended or adjusted under 35 U.S.C. 154(b) by 0 days.

(21) Appl. No.: 13/831,822

(22) Filed: Mar. 15, 2013

(51) Int. Cl.
*G06F 15/16* (2006.01)
*G06F 12/00* (2006.01)

(52) U.S. Cl.
USPC .......................................... 709/223; 709/226

(58) Field of Classification Search
USPC .................. 790/203, 217–219, 223–229, 250
See application file for complete search history.

(56) References Cited

U.S. PATENT DOCUMENTS

| | | | |
|---|---|---|---|
| 8,346,905 B2* | 1/2013 | Kamenetsky et al. | 709/223 |
| 2012/0284360 A1* | 11/2012 | Bense et al. | 709/217 |
| 2013/0132058 A1* | 5/2013 | Butler et al. | 703/21 |
| 2013/0138789 A1* | 5/2013 | Kamenetsky et al. | 709/223 |
| 2013/0179895 A1* | 7/2013 | Calder et al. | 718/104 |

* cited by examiner

Primary Examiner — Zarni Maung
(74) Attorney, Agent, or Firm — Frommer Lawrence & Haug LLP; John W. Branch

(57) ABSTRACT

Embodiments are directed towards push signaling to run jobs on available servers. Users may provide jobs or job instructions to a job control node. Job control node may determine one or more available job target nodes from among a plurality of managed nodes associated with the job control node. The job target nodes may be determined based on information included in the provided job instructions. If there are available job target nodes, the job control node may provide the job instructions to each available job target node. Further, the job control node may receive communications from one or more available job target nodes that indicates that the job target node is prepared and ready to execute the received job instructions. Next, the job control node may issue a job start command that triggers the prepared job target nodes to begin executing the provided job instructions.

30 Claims, 10 Drawing Sheets

US 8,621,062 B1

PUSH SIGNALING TO RUN JOBS ON AVAILABLE SERVERS

TECHNICAL FIELD

This invention relates generally to managing a plurality of computing devices over a network, and more particularly, but not exclusively, to managing the execution of jobs on one or more of the computing devices.

BACKGROUND

The increased deployment and popularity of cloud-based applications and services running on computing clusters of physical and virtual machines has significantly complicated configuration management tasks such as provisioning software, deploying software patches, upgrading servers, or the like. Currently, system administrators may employ a variety of ad hoc procedures to perform configuration management but for large machine clusters these ad hoc procedures may be inadequate. The inadequacies of ad hoc configuration management procedures may jeopardize the operations of critical cloud-based services. For example, ad hoc configuration management may require extended/unknown downtime for critical systems to update software and deploy patches. Further, ad hoc configuration management procedures may lack features that enable reporting, status, state monitoring, or the like, sufficient for complex configuration management jobs. In the absence of reliable information about running configuration management jobs, system administrators may have difficulty in monitoring the progress of complex configuration management jobs. Thus, it is with respect to these considerations and others that the invention has been made.

DETAILED DESCRIPTION OF THE EMBODIMENTS

Figure 1:
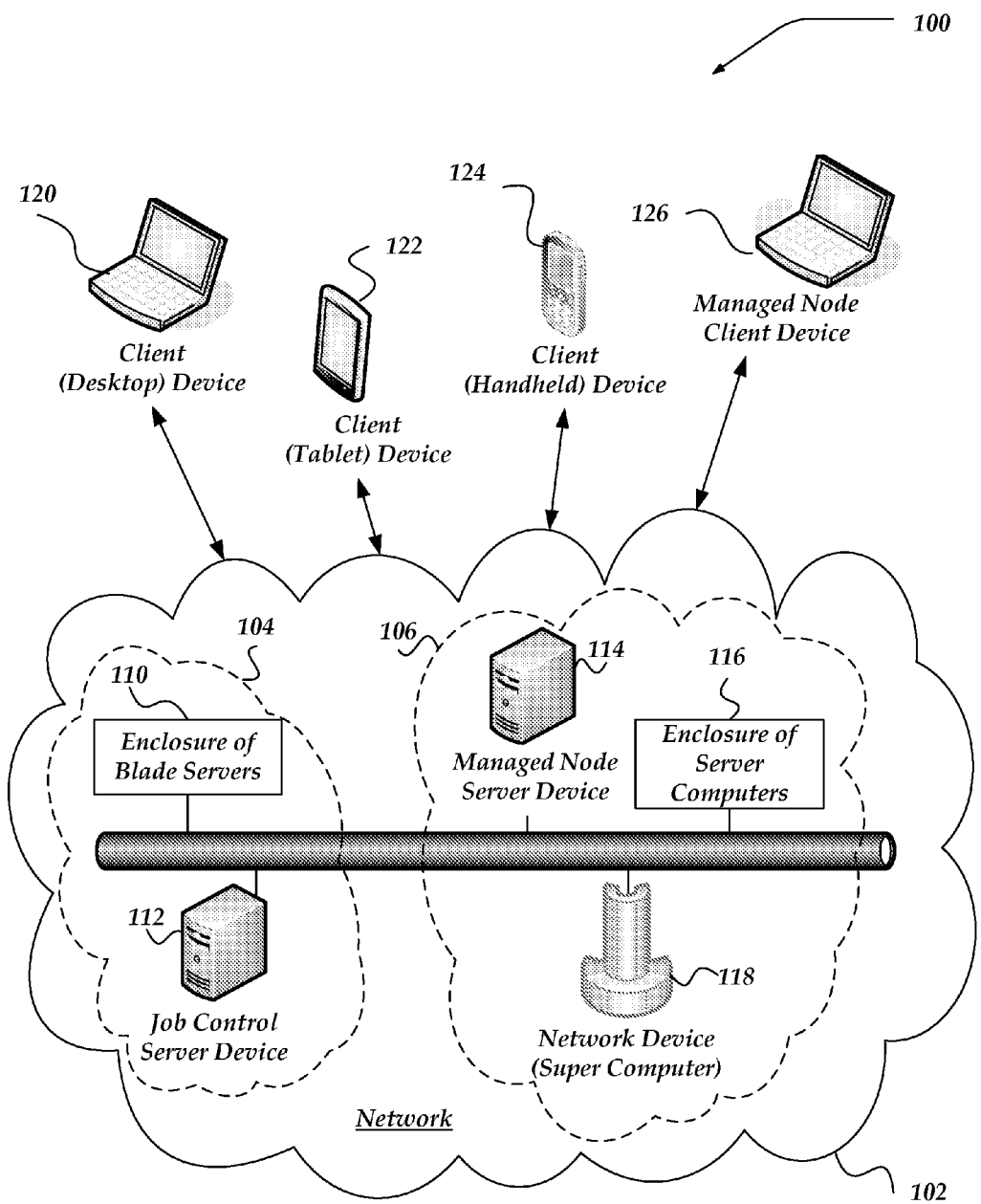
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "configuration management software" as used herein refers to software applications that provide features designed to perform tasks related to managing computing systems, such as, cataloging on-board hardware and software, provisioning software, upgrading software, license management, installing software, configuration software settings and preferences, configuration user settings and preferences, or the like. Some configuration management software may generate databases (e.g., configuration management databases) that include detailed system catalog of the computing devices under their management. Further, some configuration management software may enable searches on their system catalogs for identify managed devices that meet various conditions, such as, software versions, applications installed, hardware components, or the like, or combinations thereof.

The term "task" as used herein refers to one or more actions that may be programmatically performed on a computing device, such as, a network device and/or a client device. Tasks may be performed by executing one or more scripts and/or programs on a computing device. In some embodiments, tasks may include one or more actions for configuration management.

The term "job" as used herein refers to an instance of running a task against a determined set of managed nodes (e.g., job target nodes). Jobs may be assigned a unique identifier and persistent records of which of the managed nodes have been job target nodes for the job. Also, the outcome (success or failure) running jobs may be tracked persistently for each job target node.

The term "job instructions" as used herein refers to the one or more tasks that may be associated with a job. Job instruction may include information that may be used to determine which managed nodes should be job target nodes.

The term "job control node" as used herein refers to a network device that is operative to receive job and/or job instructions and determine if one or more of its associated managed nodes may be job target for received jobs and/or job instructions.

The term "managed node" as used herein refers to a network device or client device that is associated with a job control node and is configured to be communication with a job control node.

The term "job target node" as used herein refers to a managed node that has been determined by a job control node to be a target for a job and/or job instructions.

The term "available job target node" as used herein refers to a job target node that the job control node has determined is available for joining job and/or receiving job instructions. The set of available job target nodes may vary depending on the job instructions and the status of the managed nodes.

The term "prepared job target node" as used herein refers to an available job target node that has accepted, and is prepared to execute job instructions provided by a job control node. Prepared job target nodes may communicate with the job control node to indicate that they are prepared to execute the provided job instructions.

The term "entity groups" as used herein refers to a construct that defines a set of nodes for later operations, including but not limited to specifying job target nodes. This set can be constructed via enumeration, search expression, or other processes described later, and this specification can be static and fixed at a particular time, or dynamic and changing as time progresses.

Briefly stated, various embodiments are directed towards push signaling to run jobs on available servers. In at least one of the various embodiments, a user or automatic mechanisms may provide jobs or job instructions to a job control node. In at least one of the various embodiments, the job control node may determine one or more available job target nodes from among a plurality of managed nodes associated with the job control node. The job target nodes may be determined based on information included in the provided job instructions. If there are available job target nodes, the job control node may provide the job instructions to each available job target node.

In at least one of the various embodiments, the job control node may receive communications from one or more available job target nodes that indicates that the job target node is prepared and ready to execute the received job instructions. Next, the job control node may issue a job start command that triggers the prepared job target nodes to begin executing the provided job instructions. In at least one of the various embodiments, the job control node may be configured to issue the job start command if the number of prepared job target nodes meets or exceeds a defined threshold value. In other words, if a defined quorum of prepared job target nodes may be obtained, the job control node may issue the job start command.

In at least one of the various embodiments, if the job instructions finish executing, the job control node may record a job execution status for each of the prepared job target nodes. In at least one of the various embodiments, the execution of job instructions may be considered finished whether they fail or succeed. Prepared job target nodes that fail to execute the job instructions may be indicated by recording their failure status and job target nodes that succeeded (e.g., the job instructions ran to completion without error) may be indicated by recording their success status.

In at least one of the various embodiments, the job control node may segment the available job target nodes in groups/portions and provide the job instructions to each portion separately spaced by a determined time interval. Such an interval may be employed to reduce the possibility of performance impact that may be caused by providing the job instructions to all of the available job target nodes simultaneously. Likewise, in at least one of the various embodiments, the job control node may segment the prepared job target nodes and provide the job start command to the different segment separated by a time interval for similar reasons.

In at least one of the various embodiments, job instructions may include information employed by the job control node for determining which managed node may be job target nodes. In at least one of the various embodiments, these job instructions may include an explicit list of job target node identifiers. Also, in at least one of the various embodiments, the job instructions may include a search expression. Further, in at least one of the various embodiments, the job instructions may include one or more entity groups.

In at least one of the various embodiments, job instructions may include search expressions that may be used to identify the available job target nodes based on whether a managed node has previously succeeded or failed to execute one or more jobs and/or job instructions.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include job control server device 112, managed node server device 114, enclosure of blade servers 110, enclosure of server computers 116, super computer network device 118, and the like. Also, these arrangements of networked computing devices may or may not be mutually exclusive of each other.

In at least one of the various embodiments, job control server device 112 may include module, processes, components, services, or the like, for initiating and managing one or more configuration jobs that may be operative on managed node server device 114, managed node client device 126, or the like. Further, in at least one of the various embodiments, managed node server device 114 may include processes, modules, services, components, or the like, for managing requests and other communications to and from client devices that may be running various client applications, and for providing communications to one or more job control server devices, such as job control server device 112, and the like. In at least one of the various embodiments, job control server device 112 and/or managed node server device 114, and managed node client device 126, may be employed to validate and authenticate configuration jobs and to monitor one or more devices and/or processes that may be provided configuration jobs for processing. In at least one of the various embodiments, job control server device 112, managed node server device 114, and managed node client device may perform actions further described in conjunction with FIGS. 5-9.

Also, in at least one of the various embodiments, enclosure of blade serves 110, enclosure of enclosure of server computers 116, super computer network device 118 may include network devices that perform the actions of job control server device 112 and managed node server device 114. Further, managed node client device 126 may represent a plurality of managed node client devices that may be interacting with job control server device 112 over one or more networks.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, managed node client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
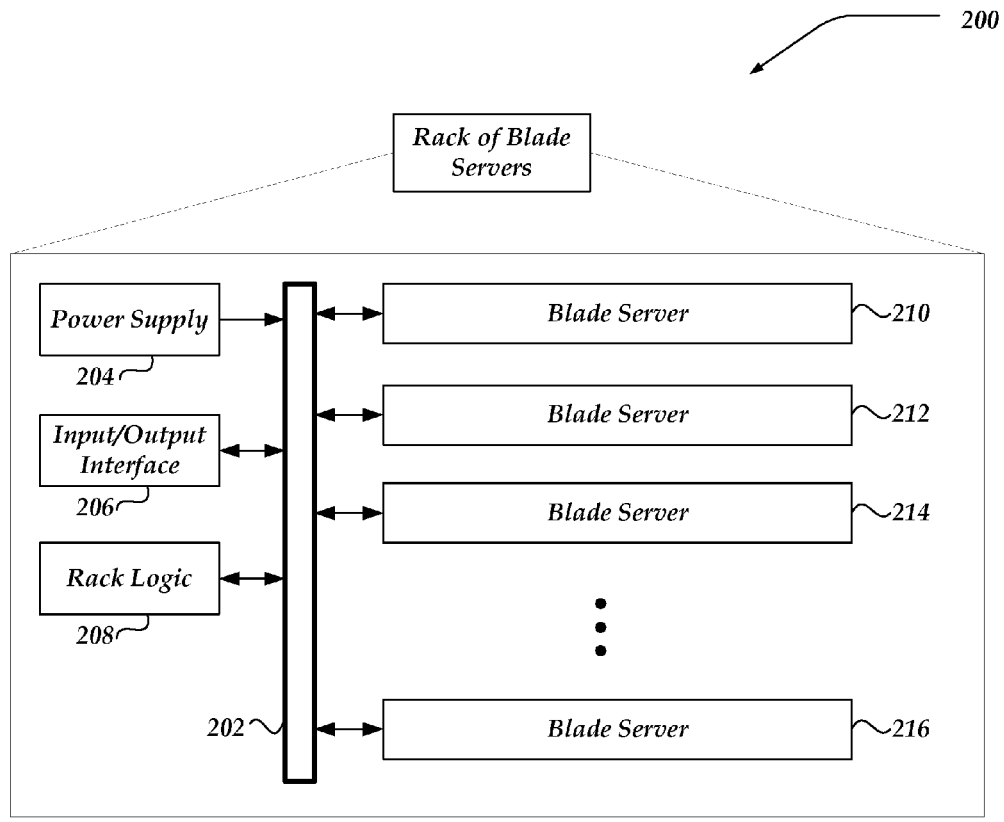
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
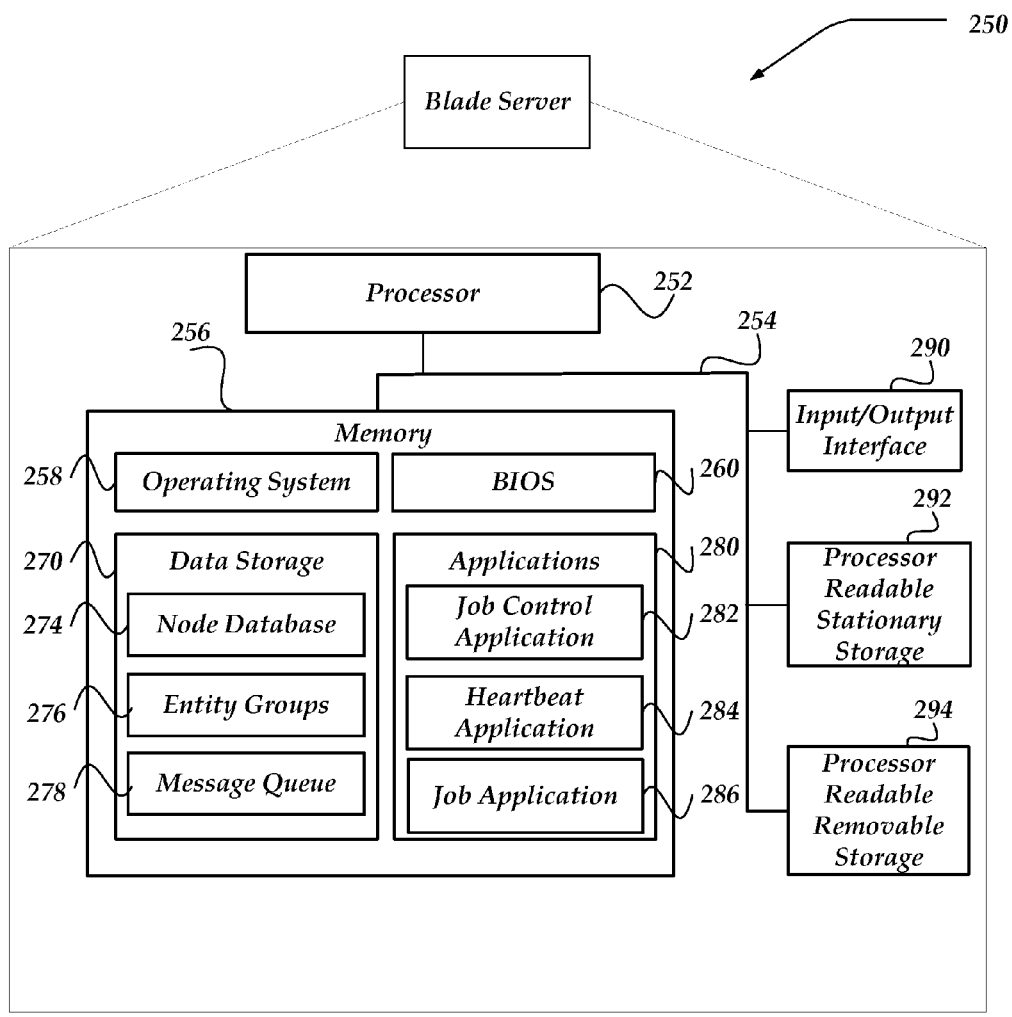
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server 250 to store, among other things, applications 280 and/or other data. Data store 270 may include program code, data, algorithms, and the like, for use by processor 252 to execute and perform actions such as those described in conjunction with FIGS. 5-9. In one embodiment, at least some of datastore 270 might also be stored on another component of blade server 250, including, but not limited to, processor-readable removable storage device 294, processor-readable stationary storage device 292, or any other non-transitory processor-readable storage device (not shown). Data storage 270 may include, for example, node database 274, entity groups 276, message queue 278, or the like. Node database 274 may contain data related to the managed nodes, their components and sub-components, as well as other supporting data. Likewise, entity groups 276 may contain entity group searches and definitions, and other supporting data, arranged in lists, databases, configuration files, or the like. And, message queue 278 may contain buffers and storage supporting communication between the managed nodes and the job control server, and supporting data.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, job control application 282, heartbeat application 284, job application 286, which may be enabled to perform actions further described below in conjunction with FIGS. 5-9.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Client Device

Figure 3:
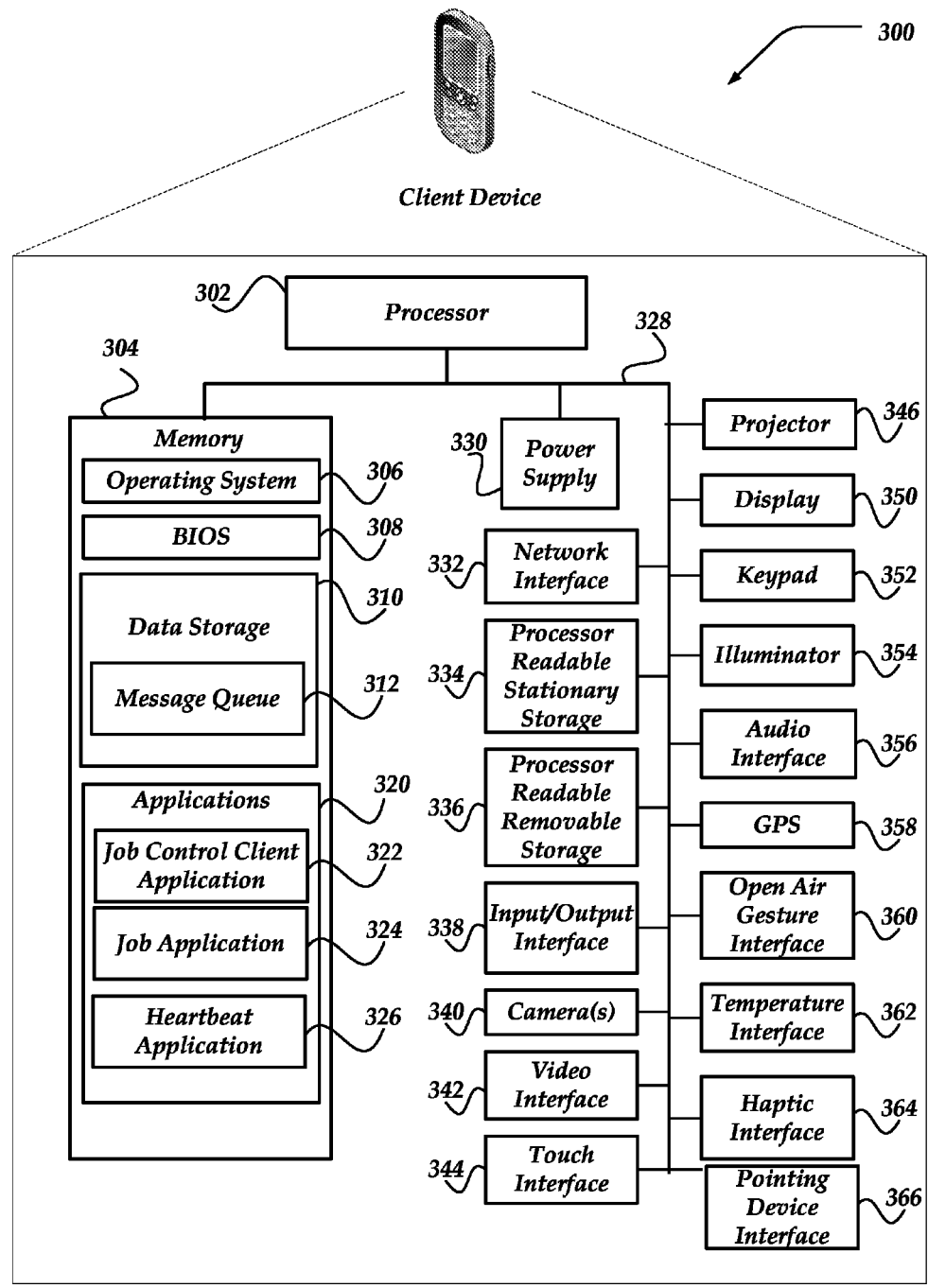
FIG. 3 shows a schematic embodiment of a client device.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by mobile device 300, transmit, receive, and/or otherwise process instructions and data. Applications 320 may include, for example, job control client application 322. In at least one of the various embodiments, job control client application 322 may be used to exchange communications to and from job control server device 114, managed node server device 112, managed node client device 126, or the like, including, but not limited to, reports, queries, searches, API calls, or the like. In at least one of the various embodiments, job application 324 may enable client device 300 to execute jobs and/or otherwise be responsive to communications from job control server device 112. Heartbeat application 326 may be operative, in at least one of the various embodiments, for enabling the communication of status updates and/or other information between client device 300 and job control server device 112. The heartbeat is a message that is emitted at defined intervals by the nodes to demonstrate that it is still online and/or available.

Other examples of application programs include calendars, search programs, email client applications, IM applications, SMS applications, Voice Over Internet Protocol (VoIP) applications, contact managers, task managers, transcoders, database programs, word processing programs, security applications, spreadsheet programs, games, search programs, and so forth.

Illustrative Network Device

Figure 4:
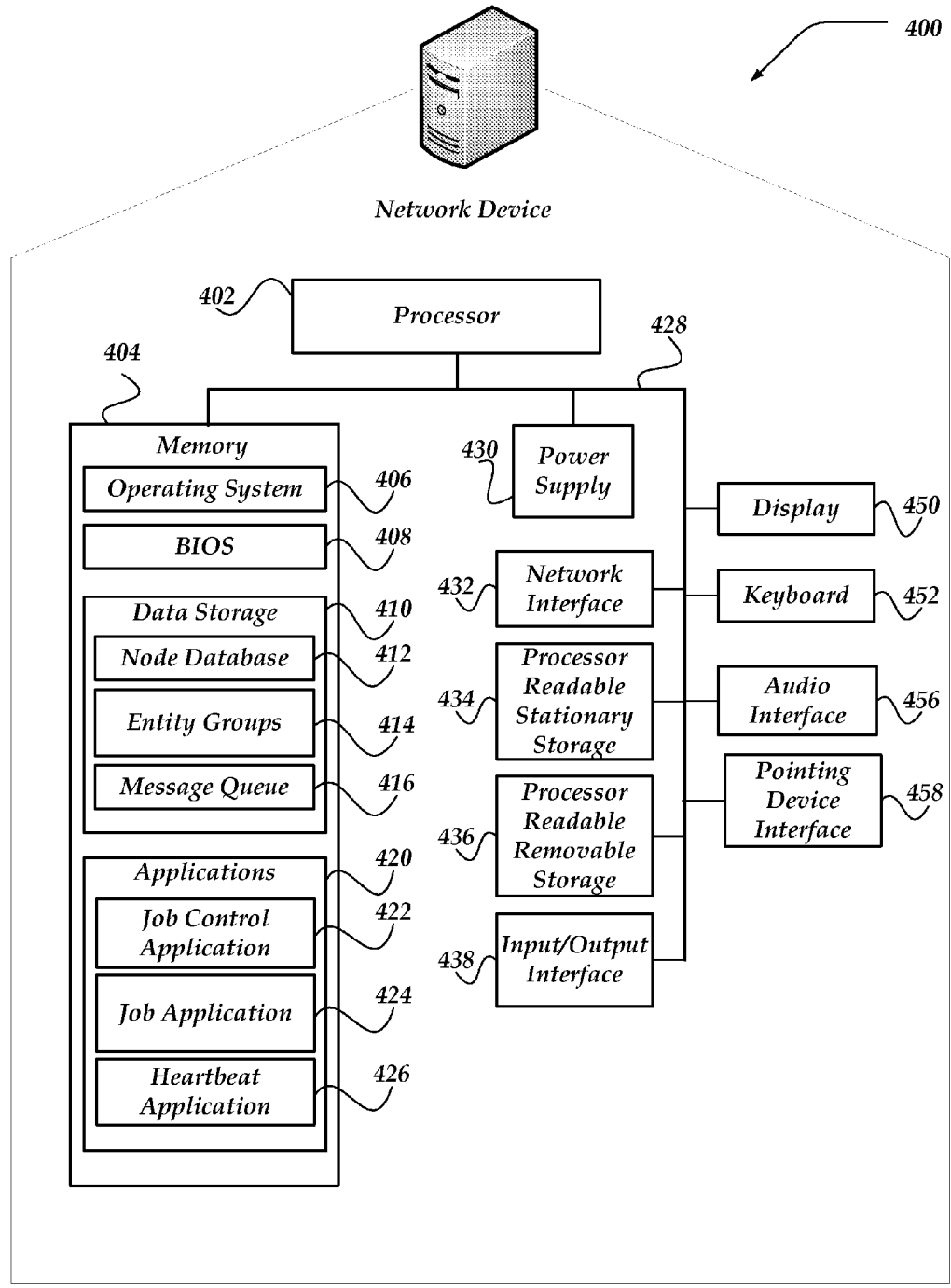
FIG. 4 illustrates a schematic embodiment of a network device.

FIG. 4 shows one embodiment of network device 400 that may be included in a system implementing at least one of the various embodiments. Network device 400 may include many more or less components than those shown in FIG. 4. However, the components shown are sufficient to disclose an illustrative embodiment for practicing these innovations. Network device 400 may represent, for example, one embodiment of at least one of job control server device 112, managed node server device 114, managed node client device 126, or client device 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those action describe in conjunction with FIGS. 5-9. In one embodiment, at least some of data storage 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, node database 412, entity groups 414, message queue 416, or the like. Node database 412 may contain data related to the managed nodes, their components and sub-components, as well as other supporting data. Also, node database 412 may be a configuration management database. Likewise, entity groups 414 may contain entity group searches and definitions, and other supporting data, arranged in lists, databases, configuration files, or the like. And, message queue 416 may contain buffers and storage supporting communication between the managed nodes and the job control server, and supporting data.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include job control application 422, job application 424, and heartbeat application 426 which may be enabled to perform actions further described below in conjunction with FIGS. 5-9. In at least one of the various embodiments, while they may be illustrated here as separate applications, job control application 422, job application 424, or heartbeat application 426 may be implemented as modules and/or components of the same application. Further, in at least one of the various embodiments, job control application 422, job application 424, or heartbeat application 426 may be implemented as operating system extensions, modules, plugins, or the like.

Illustrative Architecture

In at least one of the various embodiments, a push signaling system for running job on multiple servers may be a system that enables users to execute one or more jobs, such as configuration management jobs, on multiple network devices, client devices, blade servers, or the like.

In at least one of the various embodiments, a job control server, such as job control server device 112 running job control application 422 may be in a network that includes one or more managed node devices, such as managed node server device 114, managed node client device 126, or the like. In at least one of the various embodiments, job control server device 112 may maintain a database of each network device, client device, virtual machines, or the like, and components thereof, that may be configured to participate in the push signaling system. In at least one of the various embodiments, node database 274 and node database 412 may be employed to store information and data regarding the characteristics of the each device and component known to a job control application. In at least one of the various embodiments, each device (physical and virtual) recognized as participating in the push signaling/job control system may be considered a node (e.g., job control node, managed node, job target node, or the like).

Figure 5:
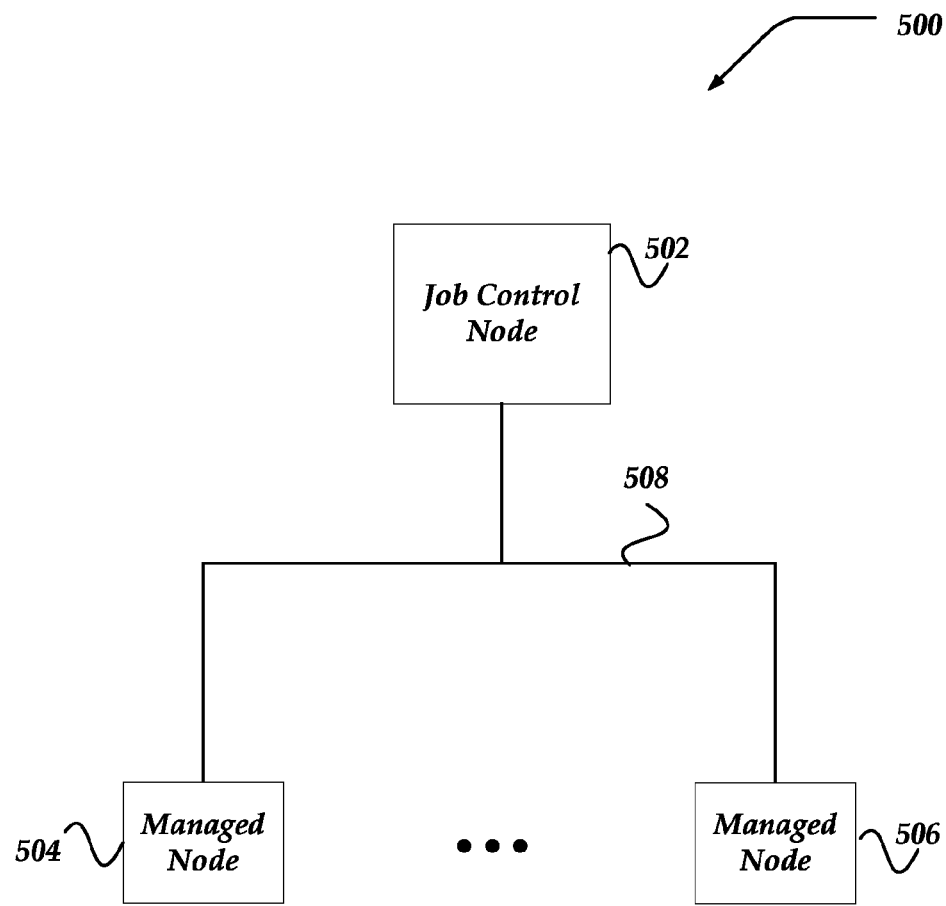
FIG. 5 illustrates a portion of a logical architecture for push signaling to run jobs in accordance with at least one of the various embodiments.

FIG. 5 illustrates a portion of architecture 500 in accordance with at least one of the various embodiments. In at least one of the various embodiments, job control node 502 may represent a job control server device, such as job control server 112. Job control node 502 may communicate with other nodes, such as managed node 504 and managed node 506 over network 508. Though just two managed nodes are shown in FIG. 5 the innovations are not so limited, one of ordinary skill in the art will appreciate that there could be more or less managed nodes and that they may be arranged using other arrangements and other network topologies. For example, some embodiments may include thousands of managed nodes. Further, architecture 500 represents a portion of a logical architecture for at least one of the various embodiments sufficient for disclosing the claimed innovations.

In at least one of the various embodiments, job control node 502 may monitor the availability, status, or other information, for each managed node, such as managed node 504 and managed node 506. The availability, status, or other information regarding each managed node may be maintained and stored in a database, such as, node database 274 and/or node database 412. Likewise, each managed node may monitor the availability, status, other information, or the like, regarding the job control node.

In at least one of the various embodiments, this joint and mutual monitoring may be enabled using heartbeat messages between the job control node and the managed nodes. In at least one of the various embodiments, job control nodes and managed nodes may be arranged to exchange heartbeat messages on defined intervals. The heartbeat messages are emitted at the defined intervals by these nodes to demonstrate that they are still online and/or available. For example, both job control node 502 and managed node 504 may be considered 'online' if they are able to exchange heartbeat messages over a network. If job control node 502 fails to receive heartbeats from managed node for some number of consecutive intervals then job control node 502 may consider managed node 504 'offline' and take actions such as, not routing any traffic to managed node 504, or the like. In at least one of the various embodiments, job control node 502 may update managed node's 504 status to 'online' if job control node 502 starts receiving heartbeats from managed node 504 again.

In at least one of the various embodiments, heartbeat messages may be provided and monitored by heartbeat applications, such as, heartbeat application 284, heartbeat application 326, and heartbeat application 426. In at least one of the various embodiments, heartbeat applications may provide regular heartbeats using various well-known networking protocols and formats. In at least one of the various embodiments, message queues, such as message queue 278, message queue 312, and/or message queue 416 may be employed to manage heartbeat messages. In at least one of the various embodiments, a heartbeat server (not shown) the monitors the heartbeat communications may be separate from the job control node and the managed nodes.

In at least one of the various embodiments, managed nodes may send heartbeat messages over a separate heartbeat channel. In at least one of the various embodiments, heartbeat messages may include an 'incarnation id', such as, a GUID created on startup and not stored. In at least one of the various embodiments, if a managed node restarts, the incarnation id may change. Changes in incarnation ids may be used to help detect managed node restarts that may happen fast enough to not substantially interrupting heartbeats. For example, in at least one of the various embodiments, job control node 502 and managed node 506 may be exchanging heartbeat messages. If the heartbeat interval for managed node is 1000 ms and the managed node crashes and restarts within 500 ms it may be possible for the managed to send a heartbeat message to the job control server before the 1000 ms heartbeat interval has expired. By including an incarnation id in the heartbeat and changing incarnation id on each startup, the job control node may be enabled to detect that managed node 506 restarted (which could potentially indicate an error condition).

In at least one of the various embodiments, job control node 502 may send out heartbeat messages at a configurable interval. In at least one of the various embodiments, heartbeat messages from the job control nodes may be simple signed message that indicate to the managed nodes that the job control node is up and ready. In at least one of the various embodiments, heartbeat messages from job control nodes may use a one-way channel. In at least one of the various embodiments, generally managed nodes do not send acknowledgements to in response to job control node heartbeats.

In at least one of the various embodiments, as managed nodes may be added to the system, a configuration and service discovery process may provide the following pieces of data: the port to subscribe to for job control node heartbeat messages, the port to send managed node heartbeats to and use for commands, the public key of the job control node, the lifetime of this configuration information, or the like.

In at least one of the various embodiments, managed nodes may send heartbeats to the job control node using addressing information (e.g., host/port) specified in configuration data provided during a discovery process that may happen if the managed node joins the system. In at least one of the various embodiments, job control nodes may refuse to send acknowledgement messages in response to the heartbeats provided by managed nodes.

In at least one of the various embodiments, heartbeat messages may be used to convey extra information. In at least one of the various embodiments, such additional information may include, additional ports the managed node may be listening on, an identifier and status of the most recently received command and/or job instruction, additional information that enables the detection of crashed managed nodes, or the like.

In at least one of the various embodiments, if the job control node heartbeat stops, managed nodes may stop sending heartbeat messages and record that the job control node is down. If the job control node heartbeat resumes, managed nodes may resume sending heartbeat messages. In at least one of the various embodiments, managed nodes may determine that the job control node is offline if it fails to receive heartbeats for a consecutive number of intervals equal or exceeding a defined threshold that may be defined as a configuration value. In at least one of the various embodiments, managed node may stop attempting to send communication to a job control node if the job control node is offline. Further, in at least one of the various embodiments, job requests provided by to the managed node from the offline job control node that have not begun execution may be discarded.

In at least one of the various embodiments, if a managed node has marked a job control node as offline it must receive heartbeats from the 'down' job control node for a consecutive number of intervals that equals or exceed a defined threshold (defined as a configuration value) before determining that the job control node is online. The managed node may resume sending data and accepting job requests from the job control nodes if they come back online.

In at least one of the various embodiments, job control nodes, such as, job control node 502 may monitor each managed node heartbeat and record the state in the database, such as, node database 412, or the like. A managed node may be treated as unavailable for jobs if it has a heartbeat status of 'down'.

In at least one of the various embodiments, a job may be started by providing job instructions to the job control node that may include, a job description, job instructions, a job-set that may be used to determine the job target nodes from the managed nodes, an initiating user id, or the like. Each managed node designated as a job target node may flow through a series of states as it executes the provided job instruction ending in either a result of OK, or FAILED. In at least one of the various embodiments, for the life of a job the states OK and FAILED are final—if a managed node/job target node enters one of these states it may stay there.

In at least one of the various embodiments, the job instructions may include a command, and optional values including: the quorum required to start the job; a timeout for the overall job execution; a timeout for execution on a single job target node; a limit on how many managed nodes may be executing simultaneously (e.g., users may want to run a job that temporarily removes node from service on many managed nodes, but limit how many of them are out of service simultaneously); a limit on the rate at which job target nodes may start the jobs (e.g., limiting load on the job control node); or the like. Further job attributes may include commands that enable a job to run with a lower priority compared to other processes running on the managed node (e.g., 'in the background'); a timeout for how long the job control node waits to achieve quorum; a timeout for how long to wait for an acknowledgement message before marking a managed node down; or the like, or combination thereof.

In at least one of the various embodiments, the managed nodes that job are targeted to execute on are called job target nodes, the set of job target nodes may be specified using a variety of methods, including explicitly as listing them; using a search feature of a configuration management system (a search may be executed against the node database returning a list of managed nodes satisfying the search criteria). Also, in at least one of the various embodiments, entity groups (named groups of managed nodes) may be employed to specify of job target node lists.

In at least one of the various embodiments, while a job is in process, job target nodes may drop heartbeats and be marked down/offline and then later return. In at least one of the various embodiments, the final job target node state for a job depends on where in the job execution process that the job control node lost the heartbeat of the job target node. For example, if the job control node loses contact with job target node after the job start command was sent but comes back up before the job has finished the returning job target node may be recorded as failing the job. In at least one of the various embodiments, the job instructions may be restarted on the job target node.

In at least one of the various embodiments, job control nodes, such as, job control node 502 may categorize managed nodes into the following execution states: idle (e.g., the managed node is up and ready to accept jobs), part of a job and/or running (e.g., the managed node is currently in a job), down (e.g., the managed node has stopped sending heartbeat messages), rehab (e.g., the managed node has experienced an error condition).

In at least one of the various embodiments, if a job control node comes online or otherwise starts up, the managed nodes are set to the rehab state to ensure that they are in a consistent state on startup. If a job is started, the managed nodes go from idle to part of the job. In at least one of the various embodiments, only idle managed nodes may be designated as job target nodes. In at least one of the various embodiments, as job target nodes complete the execution of the job, they may be returned to the idle state.

In at least one of the various embodiments, if a managed node stops sending heartbeat message, it may be indicated and recorded as being in the down state. If this happens while a job is in the process of execution, the managed node is marked as failing that job, and ejected permanently from the job. If a managed node starts sending heartbeat messaging again, it may have its state set to rehab. Also, if a managed node sends a non-heartbeat message that is not consistent with the job control node's expectations, or is otherwise determined to be broken, but still in communication with the job control node, the failing managed node may have its state set to rehab.

In at least one of the various embodiments, if a job target node is transitioning to the rehab state, the job control node may send messages that include abort commands to that job target node until the node acknowledges receiving an abort command. If the job target node acknowledges the abort command and aborts the execution of the job, it may be moved to the idle state.

In at least one of the various embodiments, job control nodes, such as, job control node 502, may be responsible for tracking jobs, job target node, managed node state, moving jobs forward, or the like. In at least one of the various embodiments, job control nodes track and monitor the state of at least, jobs, managed nodes, and job target nodes.

In at least one of the various embodiments, job control nodes may monitor the state of jobs as they transition through the major phases, including, voting, executing and finished. Job control nodes track which managed nodes have agreed to be join in a job of it and which managed node have finished the job.

In at least one of the various embodiments, entity groups may be included in job instructions as part of describing the job target nodes for a particular job. In at least one of the various embodiments, entity groups may be used to define collections of managed nodes. In at least one of the various embodiments, these collections may be created by manually (explicitly listing the managed nodes), generated by an initial static search result, or dynamically generated over time using a saved search expressions.

In at least one of the various embodiments, searches for defining entity groups may be executed against databases that include managed nodes indexed based on multiple characteristics may be used to generate collections of managed nodes to associate with an entity group. In at least one of the various embodiments, such databases may be automatically generated by applications, such as, configuration management software, manually, or other means. Entity groups are further described in conjunction with FIG. 9.

Generalized Operation

FIGS. 6-9 represent the generalized operation for push signaling to run jobs on available servers in accordance with at least one of the various embodiments. In at least one of the various embodiments, processes 600, 700, 800, and 900 described in conjunction with FIGS. 6-9 may be implemented by and/or executed on a single network device, such as network device 400 of FIG. 4. In other embodiments, these processes or portions of process thereof may be implemented by and/or executed on a plurality of network devices, such as network device 400 of FIG. 4. In yet other embodiments, these processes or portions thereof may be implemented by and/or executed on one or more blade servers, such as blade server 250 of FIG. 2B. However, embodiments are not so limited and various combinations of network devices, blade servers, or the like may be utilized. Further, in at least one of the various embodiments, the processes described in conjunction with FIGS. 6-9 may be operative in push signaling architectures such as those described in conjunction with FIG. 5.

Figure 6:
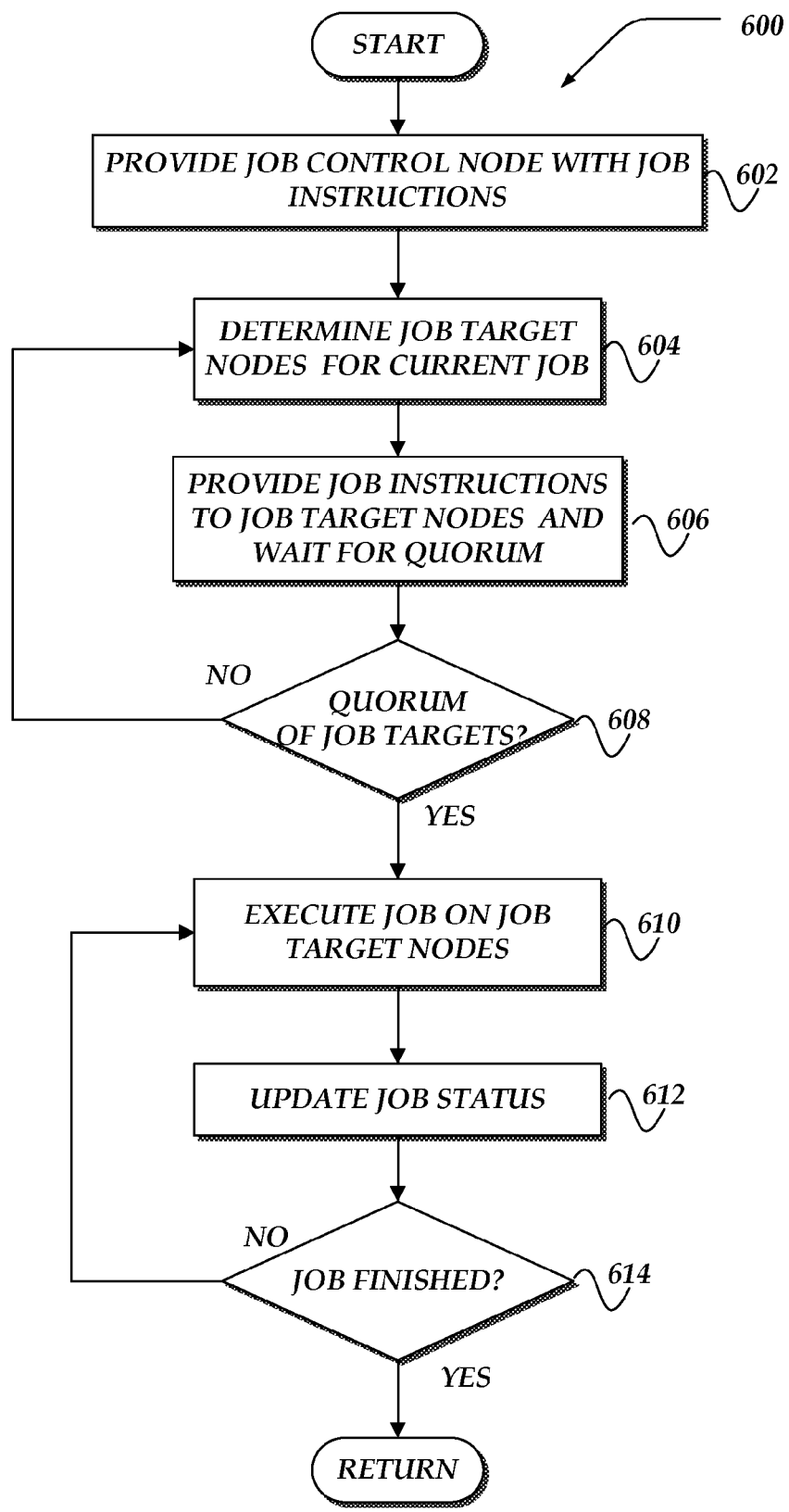
FIG. 6 shows an overview flowchart for a process for push signaling to run jobs in accordance with at least one of the various embodiments.

FIG. 6 shows an overview flowchart for process 600 for running jobs in accordance with at least one of the various embodiments. After a start block, at block 602, job instructions may be provided to a job control node. In at least one of the various embodiments, job instructions may include one or more job actions, one or more job target node lists, one or more named entity groups, or the like, or combinations thereof. In at least one of the various embodiments, job instructions may include additional information such as execution timeouts, quorum values, quorum timeouts, or the like.

In at least one of the various embodiments, job instructions may include configuration management tasks, such as, installing software, upgrading software, setting system configurations, or the like. Further, in at least one of the various embodiments, job instructions may include tasks that execute one or more ad hoc scripts directed towards performing actions on a job target node.

In at least one of the various embodiments, the job control node may validate and authenticate the provided job instructions before continuing. Next, control may flow to block 604.

At block 604, the job target nodes for the provided job instructions may be determined. In at least one of the various embodiments, various methods may be employed for determined which managed nodes should be determined to be job target nodes. In at least one of the various embodiments, the job instructions may require a minimum number of job target nodes to be determined to continue processing. See, FIG. 7 for at least a more detailed description for determining job target nodes.

At block 606, the current job, based on the provided job instructions, may be provided to the determined job target nodes. In some embodiments, the job control node may delay forwarding the job instructions until there are sufficient job target nodes available.

At decision block 608, if the quantity of job target nodes that accept the job instructions meets or exceeds a defined threshold value, a quorum may be deemed to be acquired and control may move to block 610. Otherwise, in at least one of the various embodiments, control may loop back to block 604. In at least one of the various embodiments, a timeout, number-of-tries value, or the like, may be configured and used by the job control node to as part of determining if the job should be aborted before a quorum is reached.

In at least one of the various embodiments, if the job is aborted, the job control node may update a database to record that the job was aborted by the job control node. In at least one of the various embodiments, if the job was started on one more job target nodes, an abort command may be provided to them. In at least one of the various embodiments, in response to receiving an abort command, job target nodes may cancel the execution of the job instructions and may update their state to "rehab" before returning into the "idle" state.

At block 610, the provided job instructions may be executed on the job target nodes that may be determined to be available and prepared for running the job. In at least one of the various embodiments, the job control node may send the job instructions to each determined job target node for execution. As the job target nodes begin executing the job they may change their status/state to "part of a job" and provide the appropriate status update to the job control node.

In at least one of the various embodiments, the job instructions may be sent to the job target node before it is provided a command from the job control node to start executing the job. If the job instructions are provided before the start command is provided, the job instructions may be used to determine if the job target node may accept and/or acknowledge the job. For example, the job instructions may include conditions or information that disqualifies a job target node from running the job. In some cases, the relevant conditions of the job target node may be unknown to the job control node at the time the job target nodes were determined. Also, the job target node may enter into a disqualifying state in between the time the job target node joined in the job quorum and when the job start command is provided. In any case, the job target node may communicate to the job control node that is no longer available to run the job instructions.

At block 612, the job status for the currently running job may be updated. In at least one of the various embodiments, the job control node may monitor the job status. In at least one of the various embodiments, job targets may either finish a job successfully, or fail to finish a job. In at least one of the various embodiments, Job target nodes that accept a job and then back out after the start command is provided may be recorded as failing the job.

In at least one of the various embodiments, the job control node may monitor the status of the job target node by monitoring their heartbeat messages and other communications related to the job currently being executed. In at least one of the various embodiments, if error conditions that interfere with the successful completion of the job are encountered, the job target node is recorded as failing the job. In at least one of the various embodiments, job target nodes that have not failed continue executing the job until they fail, finish, or receive an abort command from the job control node. In at least one of the various embodiments, job target nodes may be arranged to log or otherwise, record one or more of the events or conditions that occur during the execution of the job.

At decision block 614, if the job is finished, control may be returned to a calling process. Otherwise, control may loop back to block 610. In at least one of the various embodiments, a job may be determined to be finished based on one or more of a variety of condition having been met. Such conditions may include, a timeout having been exceeded, a number of job target node failures exceeding a defined threshold value, a number of job target node successful finishes exceeds a threshold value, an abort command sent by a user, or the like.

In at least one of the various embodiments, if the job control node has determined that a job is finished (or should be finished) it may send abort commands to the job target nodes that may still be indicated as executing the job instruction associated with the job.

Figure 7:
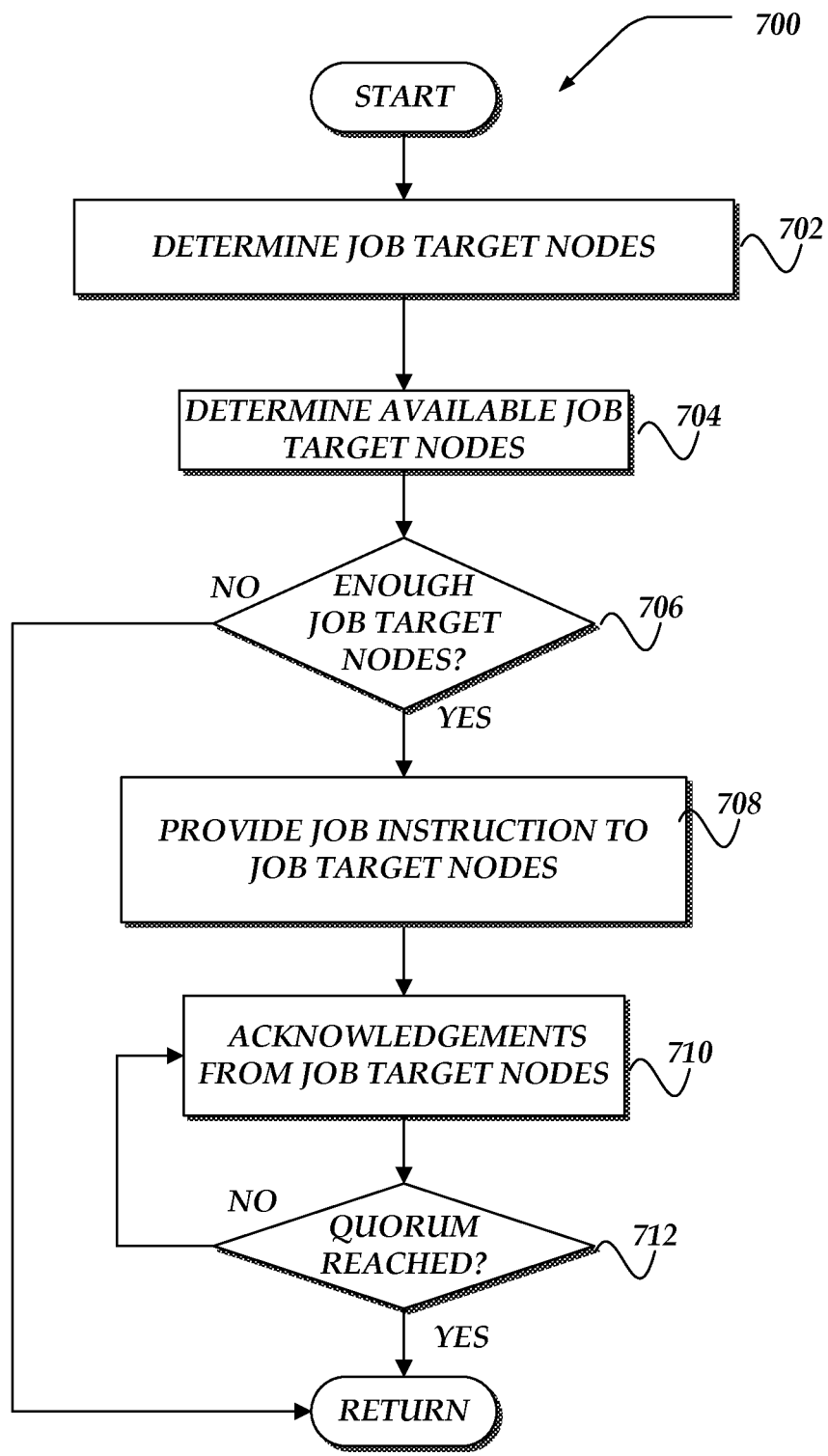
FIG. 7 shows an overview flowchart for a process for determining job target nodes in accordance with at least one of the various embodiments.

FIG. 7 shows an overview flowchart for process 700 for determining job target nodes in accordance with at least one of the various embodiments. After a start block, at block 702, the job control server may determine the job target nodes based at least on information provided with the job instructions. In at least one of the various embodiments, job instructions may include a list of specific job target nodes using identifiers such as, hostnames, IP addresses, MAC addresses, IP network masks, software installed on the target node, configuration values on the target, or nearly any other measurable characteristic of the target node, or combination thereof. In at least one of the various embodiments, job instructions may include entity groups that may be expanded into object sets that may include job target node identifiers for the job. Further, in at least one of the various embodiments, job instructions may include a search expression for identifying job target nodes.

In at least one of the various embodiments, configuration management applications may include databases (e.g., node database 274 and node database 412) for indexing the characteristics of the various objects that are present in on manage nodes. Searches may be conducted against configuration databases to produce a list of objects, including job target nodes, that have attributes defined by the search query. For example, a search such as, "SELECT targets WHERE operating_system=Linux and operating_system_version=2.4" may result in an object set that includes managed nodes that are running the operating system Linux Version 2.4. Note that of ordinary skill art will appreciate that configuration management software may employ a variety of standard and/or proprietary searching mechanisms for selecting job target nodes from the set of available managed nodes. The innovations herein are not limited to a particular configuration management software and/or configuration management query language. Thus, various configuration management systems may be employed without departing from the spirit and scope of these innovations.

In summary, in at least one of the various embodiments, to identify job target nodes, job instructions may include, explicit lists of job target node identifiers, one or more entity groups, search expressions formed from query languages, or the like, or combination thereof. In at least one of the various embodiments, these lists may be statically formed at the time a job may be starting, or the lists may be dynamically created and updated during the execution of the job.

At block 704, the job control node may determine which of the determined job target nodes may be available for running a job. In at least one of the various embodiments, the job control node may lookup the status of each job target node in a database, such as, node database 274 and/or node database 412. In at least one of the various embodiments, some jobs may be configured to require the number of available job target nodes to exceed a defined threshold before continuing.

In at least one of the various embodiments, managed nodes registered with the job control node may communicate their status to the job control node (e.g., using heartbeat messages, or the like). Based on these communications, the job control node may maintain a record of the status of managed nodes in a database. If a managed node is down or otherwise unable to communicate its status to the job control node, the job control nodes may record the status of such nodes as 'down'. In at least one of the various embodiments, if a managed node marked as 'down' restores communication with the job control node, its status may be updated to 'rehab' and/or 'idle' based on the communication.

At decision block 706, if the number of available job targets exceeds a defined threshold, control may move to block 708. Otherwise, in at least one of the various embodiments, control may be returned to a calling process.

In at least one of the various embodiments, some job instructions may require a minimum number of qualifying job target nodes before moving forward. If the number of available job target nodes is insufficient, the job control node may abort the job immediately rather than continuing with the process.

In at least one of the various embodiments, job target node availability may be based in part on the current status of the job target nodes as understood by the job control node. In at least one of the various embodiments, job control nodes may use node status records maintained in a node database rather than directly querying the job target nodes. If there may be a discrepancy between the status values recorded in the node database and the job target node actual status, the value in the node database may be used.

At block 708, the job control node may provide the job instructions to each of the available job target nodes. In at least one of the various embodiments, the job control node may push the job instructions to each available job target node over a network using a variety of network protocols and/or data formations. In at least one of the various embodiments, network protocols may include, TCP, FTP, HTTP, or the like. In at least one of the various embodiments, the job instructions may be comprised of data formats, such as, JSON, XML, HTML, or the like, or combination thereof.

In at least one of the various embodiments, distribution of the job instructions may be staggered using varying time intervals. If job instructions need to be provided to a large number job target nodes, staggering the delivery of the job instructions may be enabled to avoid flooding the network and/or overburdening the job control node. In at least one of the various embodiments, the job control node may segment the job target nodes into one or more groups and send the job instructions to the groups separated by time intervals having a length that may be set by a determined configuration value, or calculated based in part on the number of job target nodes. In at least one of the various embodiments, the job control node may stagger the delivery of job instructions to limit the total number of target nodes executing jobs at one time, the rate at which target nodes may start executing or both.

At block 710, the job control node may wait for acknowledgement from the job target nodes that the job instructions have been delivered. In at least one of the various embodiments, job target nodes may acknowledge that the job target node is prepared to execute the job instructions. Likewise, the acknowledgment may inform the job control node that the job target node may be unable to execute the provided job instructions.

In at least one of the various embodiments, some job instructions may have quorum requirement based on a minimum value of "ready" acknowledgments that must be provided before the job should be started. For example, job instructions that may apply to a potential of one thousand job target nodes may be configured to execute if at least three hundred job targets acknowledge that they are prepared to run the job.

At decision block 712, if a quorum sufficient to satisfy the job instructions and other relevant configuration information is met or exceeded, control may be returned to a calling process. Otherwise, control may loop back to block 710 to continue waiting for a quorum to be met.

In at least one of the various embodiments, the job control node may be arranged to include a timeout value that establishes a maximum amount to time to wait for a quorum. Also, in at least one of the various embodiments, during the quorum gathering period, users with sufficient privileges may monitor the progress of a job and abort it if desired. Further, in at least one of the various embodiments, job instructions may include timeout that may be used for determining how long to wait for a job target node quorum.

Figure 8:
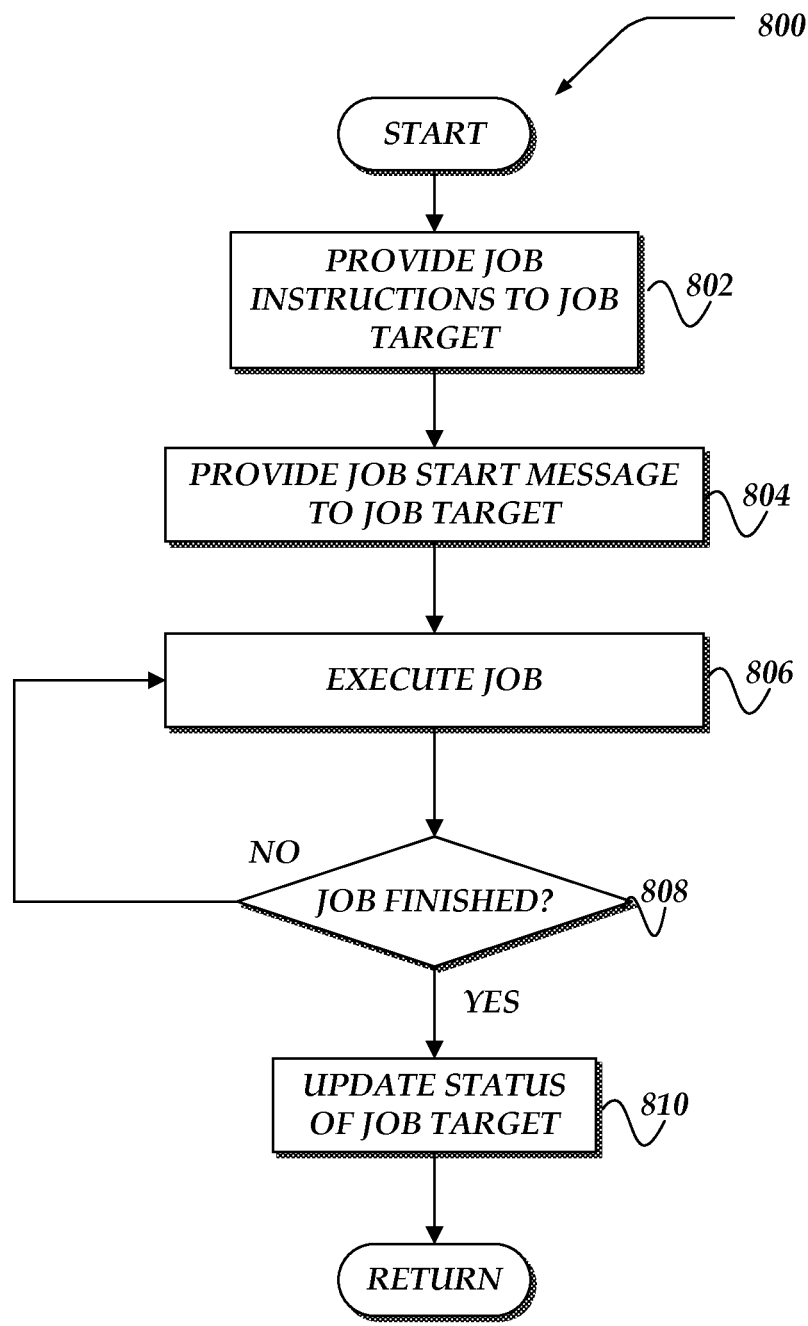
FIG. 8 shows an overview flowchart for a process for execution job instructions on job target nodes in accordance with at least one of the various embodiments.

FIG. 8 shows an overview flowchart for process 800 for executing a job on a job target node in accordance with at least one of the various embodiments. After a start block, at block 802, job instructions may be provided to a job target node. In at least one of the various embodiments, the job control node may have determined that the initial conditions associated with the job instructions have been met, such as, having sufficient prepared job target nodes, or the like, and thus the job instructions may be provided to each job target node determined to be qualified to execute the job.

At block 804, a message that includes a job start command may be provided to the prepared job target nodes. In at least one of the various embodiments, if the job target node becomes unavailable after the job instructions have been provided and before the start message is provided, the job target node may be determined to have failed to execute the job.

In at least one of the various embodiments, the job target node may be enabled to authenticate the provided job instructions before starting the job. If the job instructions fail authentication tests, the job target node may be determined to have failed to execute the job.

In at least one of the various embodiments, job instructions may include or be associated with one or more authentication credentials, such as, user identifiers, passwords, cryptographic signatures, security certificates, or the like. These credentials may be used in part to determine if the job instructions have the authority to execute on job target node.

In at least one of the various embodiments, in some cases, job instructions may be encrypted and successful authentication may include successful decryption of the provided job instructions. Also, in at least one of the various embodiments, in some cases, job instructions may be signed and successful authentication may include successful validation of the provided job instructions.

At block 806, the job target node may begin performing the actions corresponding to the provided job instructions. In at least one of the various embodiments, the job target node may update its status to reflect that it is running a job. The status change may be communicated to the job control node that may be monitoring the job.

In at least one of the various embodiments, if the job runs to completion without error, the job target node may be considered to have completed the job. In at least one of the various embodiments, if the job generates unrecoverable errors, or is otherwise unsuccessful, the job target node may be considered to have failed the job.

At decision block 808, if the job is finished, control may move to block 810. Otherwise, control may loop back to block 806 to continue executing the job on the job target node. In at least one of the various embodiments, if the job target node has successfully completed the job, or if it has failed the job, then the job may be finished for the particular job target node.

In at least one of the various embodiments, other conditions, such as, timeouts, abort commands, or the like, may result in the job being determined to be finished. However, in at least one of the various embodiments, the job target node may be recorded as completing the job successfully only if the job instructions have run to completion without error.

At block 810, the job target may update its current status and/or the current status of the job. In at least one of the various embodiments, the status may be communicated to the job control node. In at least one of the various embodiments, whether the job was completed, or it failed, the job target node may report the status change to the job control node before returning control to a calling process.

In at least one of the various embodiments, for each job target node, the job control node may record whether it completed of failed a job. In at least one of the various embodiments, further job instructions may be provided by the job control node to re-run a jobs on job target node that previously failed a job. Likewise, another job instruction may be targeted at managed nodes based on if they have completed or failed previously submit jobs.

Figure 9:
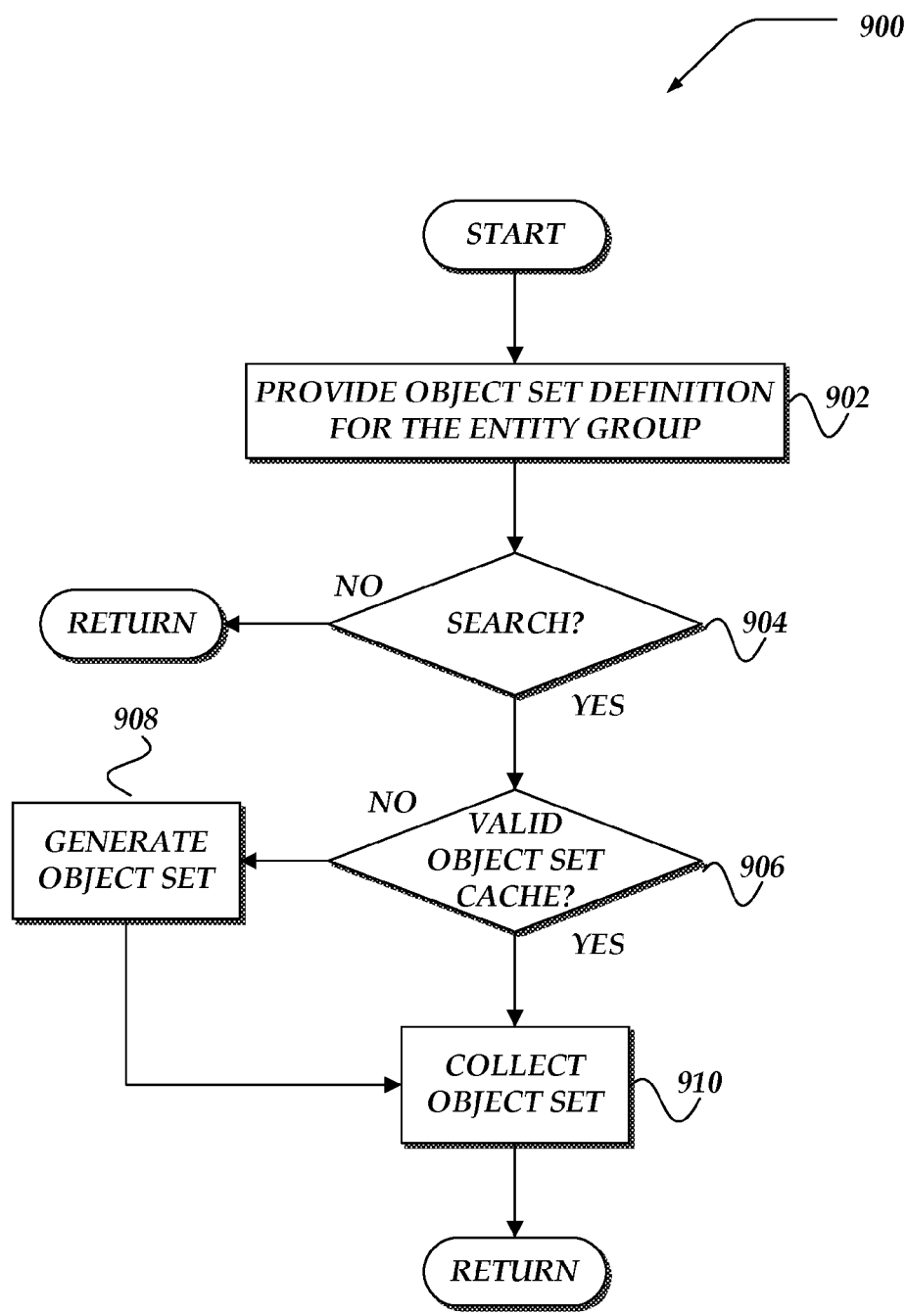
FIG. 9 shows an overview flowchart for a process for generating entity groups in accordance with at least one of the various embodiments.

FIG. 9 shows an overview flowchart for process 900 for generating entity groups in accordance with at least one of the various embodiments. As discussed above, entity group may be included in job instructions, for among other things, describing the job target nodes for a particular job. After a start block, at block 902 an object set definition may be provided for an entity group. In at least one of the various embodiments, entity groups may be configured to define groups of objects and/or components, including at least, managed nodes and job target nodes. In at least one of the various embodiments, entity groups may be used in job instructions to replace literal identities of job target nodes.

In at least one of the various embodiments, entity groups may be associated with a name and/or description that may be used for indentifying the entity group. For example, an entity group that includes all database servers located in Seattle may be named "Seattle db servers."

In at least one of the various embodiments, entity groups may be defined to represent various objects recognized and/or defined by a configuration management software application. For example, a database generated by a configuration management application may include objects, such as, client devices, network devices, blade servers, routers, switches, external storage devices, or the like. Also, for each component recognized by the configuration management application there may numerous additional records used to index one or more details for each of the cataloged components, such as, operating systems, installed software applications, network interfaces, networking configuration, user information, CPU information, physical memory information, or the like.

In at least one of the various embodiments, entity groups by assigning objects using lists or express values that identify one or more objects. Also, in at least one of the various embodiments, objects may be assigned to an entity group based on a search expression. In at least one of the various embodiments, entity groups may be defined to be dynamic, such that they periodically re-populate the collection of assigned objects by rerunning the search expression that may be associated with the entity group.

In at least one of the various embodiments, search expressions used to define the object assigned to an entity group may include query terms that reference objects indexed and/or made available by a configuration management application. Thus, searches may be described to collect managed nodes based any of the characteristics that may be indexed by the configuration management system.

In at least one of the various embodiments, if an entity group is configured to be dynamic, additional attributes may be associated with the entity group, such as, refresh interval, caching options, time-to-live values, or the like. In at least one of the various embodiments, additional rules that may act like filters may be associated with entity groups for excluding one or more objects from an entity groups.

In at least one of the various embodiments, entity groups may be defined by including other entity groups. If entity groups are nested or included they may be expanded at the time the entity groups is employed. For example, entity group "database servers" may be defined using other entity groups, such as:

"database_servers=seattle_db_servers, dallas_db_servers, newark_db_servers."

At decision block 904, if the definition for the entity group is based on a search expression, control may flow to decision block 906. Otherwise, the entity group and its associated object set identifiers may be stored in a database after which control may be returned to a calling process. In at least one of the various embodiments, if the entity group is not defined based in part on a search expression, the literal values that have been provided for the definition of the entity group may be stored for use by other process.

At decision block 906, if a valid object set cache is available, control may flow to block 910. Otherwise, control may flow to block 908.

In at least one of the various embodiments, various caching techniques may be used to reduce the amount of searches that need to be executed. In at least one of the various embodiments, the search expression associated with the entity group may be normalized and hash values may be generated to use as a cache key. In at least one of the various embodiments, the results of the search may be stored in a database and associated with the hash value. If a search that has a matching hash value may be received, the corresponding object values may be retrieved using the hash value rather executing a search.

In at least one of the various embodiments, cache entries may have time out/time-to-live values that may be set using various configuration values. Configuration values may be set on a system-wide basis, entity group basis, or the like. For example, in at least one of the various embodiments, users may have domain knowledge that indicates that the objects assigned a first entity group may be relatively static, while the objects assigned to a second entity group may be highly variable. Thus, in this example, it may be reasonable for the user to establish a relatively long timeout interval for the first entity group and to establish a shorter timeout interval for the second entity group.

At block 908, the object set corresponding to the dynamic object set definition may be generated by executing the search expression. In at least one of the various embodiments, the search expression may execute against a database generated by a configuration management application.

At block 910, the object set information corresponding to the entity group may be collected. In at least one of the various embodiments, the process of collecting the objects associated with the entity groups may vary depending one the information that was stored in the cache or that is generated by executing the search expression. Next, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitory storage media, or the like.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware systems which perform the specified actions or steps, or combinations of special purpose hardware and computer instructions.

What is claimed as new and desired to be protected by Letters Patent of the United States is:

1. A method for managing a job over a network, comprising:
    providing at least one job instruction to a job control node;
    enabling a heartbeat message to be communicated between at least the job control node and at least one of a plurality managed nodes;
    determining at least one of the plurality of managed nodes that is available to be managed as a job target node based on the at least one job instruction and the heartbeat message;
    providing the at least one job instruction to each of the available job target nodes;
    determining at least one job target node that is prepared to execute the at least one job instruction based on at least an acknowledgement provided by each of the prepared job target nodes;

executing the at least one job instruction on each of the prepared job target nodes; and if the at least one job instruction is finished executing on each of the prepared job target nodes, record a job status for each of the prepared job target nodes, wherein a status for the at least one job instruction is updated.

2. The method of claim 1, wherein executing the at least one job instruction further comprises, delaying the execution of the at least one job instruction until a quantity of prepared job target nodes exceeds a defined threshold.

3. The method of claim 1, wherein executing the at least one job instruction, further comprises, executing the at least one job instruction on at least a portion of a plurality of prepared job target nodes and executing the at least one job instruction on at least another portion of the plurality of prepared job target nodes after a determined time interval.

4. The method of claim 1, further comprising, determining at least one job target node associated with at least one entity group based on a search of a configuration management database, wherein the at least one entity group includes at least one type of node.

5. The method of claim 1, wherein determining if the at least one job instruction is finished, further comprises, determining if the at least one job instruction is successfully completed or if the at least one job instruction failed to complete.

6. The method of claim 1, wherein determining the at least one available job target node, further comprises, searching among a plurality of managed nodes based on at least one entity group, wherein the at least one entity group includes at least one type of node.

7. The method of claim 1, wherein determining the at least one available job target node, further comprises, searching for at least one managed node that is indicated as previously failing to successfully complete the at least one job instruction.

8. The method of claim 1, wherein providing the at least one job instruction to each of the available job target nodes, further comprises, staggering a delivery of the at least one job instruction to at least a portion of the prepared job target nodes by a determined time interval.

9. A system that is arranged for managing a job over a network, comprising:
A job control node comprising:
a transceiver that is operative to communicate over the network;
a memory that is operative to store at least instructions; and
a processor device that is operative to execute instructions that enable actions, including:
providing at least one job instruction to a job control node;
communicating a heartbeat message between at least the job control node and at least one of a plurality managed nodes;
determining at least one of the plurality of managed nodes that is available to be managed as a job target node based on the at least one job instruction and the heartbeat message;
providing the at least one job instruction to each of the available job target nodes;
determining at least one job target node that is prepared to execute the at least one job instruction based on at least an acknowledgement provided by each of the prepared job target nodes;
executing the at least one job instruction on each of the prepared job target nodes; and
if the at least one job instruction is finished executing on each of the prepared job target nodes, record a job status for each of the prepared job target nodes, wherein a status for the at least one job instruction is updated; and
a job target node, comprising:
a transceiver that is operative to communicate over the network;
a memory that is operative to store at least instructions; and
a processor device that is operative to execute instructions that enable actions, including:
communicating a heartbeat message to the at least the job control node; and
executing the at least one job instruction.

10. The system of claim 9, wherein executing the at least one job instruction further comprises, delaying the execution of the at least one job instruction until a quantity of prepared job target nodes exceeds a defined threshold.

11. The system of claim 9, wherein executing the at least one job instruction, further comprises, executing the at least one job instruction on at least a portion of a plurality of prepared job target nodes and executing the at least one job instruction on at least another portion of the plurality of prepared job target nodes after a determined time interval.

12. The system of claim 9, further comprising, determining at least one job target node associated with at least one entity group based on a search of a configuration management database, wherein the at least one entity group includes at least one type of node.

13. The system of claim 9, wherein determining if the at least one job instruction is finished, further comprises, determining if the at least one job instruction is successfully completed or if the at least one job instruction failed to complete.

14. The system of claim 9, wherein determining the at least one available job target node, further comprises, searching among a plurality of managed nodes based on at least one entity group, wherein the at least one entity group includes at least one type of node.

15. The system of claim 9, wherein determining the at least one available job target node, further comprises, searching for at least one managed node that is indicated as previously failing to successfully complete the at least one job instruction.

16. The system of claim 9, wherein providing the at least one job instruction to each of the available job target nodes, further comprises, staggering a delivery of the at least one job instruction to at least a portion of the prepared job target nodes by a determined time interval.

17. A processor readable non-transitive storage media that includes instructions for managing a job over a network, wherein execution of the instructions by a processor device enables actions, comprising:
providing at least one job instruction to a job control node;
communicating a heartbeat message between at least the job control node and at least one of a plurality managed nodes;
determining at least one of the plurality of managed nodes that is available to be managed as a job target node based on the at least one job instruction and the heartbeat message;
providing the at least one job instruction to each of the available job target nodes;
determining at least one job target node that is prepared to execute the at least one job instruction based on at least an acknowledgement provided by each of the prepared job target nodes;

executing the at least one job instruction on each of the prepared job target nodes; and if the at least one job instruction is finished executing on each of the prepared job target nodes, record a job status for each of the prepared job target nodes, wherein a status for the at least one job instruction is updated.

18. The media of claim 17, wherein executing the at least one job instruction further comprises, delaying the execution of the at least one job instruction until a quantity of prepared job target nodes exceeds a defined threshold.

19. The media of claim 17, wherein executing the at least one job instruction, further comprises, executing the at least one job instruction on at least a portion of a plurality of prepared job target nodes and executing the at least one job instruction on at least another portion of the plurality of prepared job target nodes after a determined time interval.

20. The media of claim 17, further comprising, determining at least one job target node associated with at least one entity group based on a search of a configuration management database, wherein the at least one entity group includes at least one type of node.

21. The media of claim 17, wherein determining if the at least one job instruction is finished, further comprises, determining if the at least one job instruction is successfully completed or if the at least one job instruction failed to complete.

22. The media of claim 17, wherein determining the at least one available job target node, further comprises, searching among a plurality of managed nodes based on at least one entity group, wherein the at least one entity group includes at least one type of node.

23. The media of claim 17, wherein determining the at least one available job target node, further comprises, searching for at least one managed node that is indicated as previously failing to successfully complete the at least one job instruction.

24. A network device that is operative for managing a job over a network, comprising:
- a transceiver that is operative to communicate over a network;
- a memory that is operative to store at least instructions; and
- a processor device that is operative to execute instructions that enable actions, including:
  - providing at least one job instruction to a job control node;
  - enabling a heartbeat message to be communicated between at least the job control node and at least one of a plurality managed nodes;
  - determining at least one of the plurality of managed nodes that is available to be managed as a job target node based on the at least one job instruction and the heartbeat message;
  - providing the at least one job instruction to each of the available job target nodes;
  - determining at least one job target node that is prepared to execute the at least one job instruction based on at least an acknowledgement provided by each of the prepared job target nodes;
  - executing the at least one job instruction on each of the prepared job target nodes; and
  - if the at least one job instruction is finished executing on each of the prepared job target nodes, record a job status for each of the prepared job target nodes, wherein a status for the at least one job instruction is updated.

25. The network device of claim 24, wherein executing the at least one job instruction further comprises, delaying the execution of the at least one job instruction until a quantity of prepared job target nodes exceeds a defined threshold.

26. The network device of claim 24, wherein executing the at least one job instruction, further comprises, executing the at least one job instruction on at least a portion of a plurality of prepared job target nodes and executing the at least one job instruction on at least another portion of the plurality of prepared job target nodes after a determined time interval.

27. The network device of claim 24, further comprising, determining at least one job target node associated with at least one entity group based on a search of a configuration management database, wherein the at least one entity group includes at least one type of node.

28. The network device of claim 24, wherein determining if the at least one job instruction is finished, further comprises, determining if the at least one job instruction is successfully completed or if the at least one job instruction failed to complete.

29. The network device of claim 24, wherein determining the at least one available job target node, further comprises, searching among a plurality of managed nodes based on at least one entity group, wherein the at least one entity group includes at least one type of node.

30. The network device of claim 24, wherein determining the at least one available job target node, further comprises, searching for at least one managed node that is indicated as previously failing to successfully complete the at least one job instruction.

* * * * *

UNITED STATES PATENT AND TRADEMARK OFFICE
CERTIFICATE OF CORRECTION

PATENT NO.      : 8,621,062 B1
APPLICATION NO. : 13/831822
DATED           : December 31, 2013
INVENTOR(S)     : Anderson et al.

It is certified that error appears in the above-identified patent and that said Letters Patent is hereby corrected as shown below:

In the Specification

Column 6, Lines 60-61, delete "Backplane 208" and insert -- Backplane 202 --, therefor.

Column 10, Lines 64-65, delete "job control server device 114, managed node server device 112," and insert -- job control server device 112, managed node server device 114, --, therefor.

Column 23, Line 42, delete ""database servers"" and insert -- "database_servers" --, therefor.

Column 24, Line 21, delete "one the" and insert -- on the --, therefor.

In the Claims

Column 25, Line 44, in Claim 9, delete "A job" and insert -- a job --, therefor.

Signed and Sealed this
Twenty-fourth Day of June, 2014

Michelle K. Lee
*Deputy Director of the United States Patent and Trademark Office*